United States Patent [19]

Wakabayashi et al.

[11] Patent Number: 4,977,228

[45] Date of Patent: Dec. 11, 1990

[54] CURABLE POLYMER COMPOSITION

[75] Inventors: Hiroshi Wakabayashi; Hisami Iwakiri; Kazuhiko Tamai; Katsuhiko Isayama, all of Kobe, Japan

[73] Assignee: Kanegafuchi Chemical Industry Co., Ltd., Osaka, Japan

[21] Appl. No.: 325,256

[22] Filed: Mar. 17, 1989

[30] Foreign Application Priority Data

Mar. 17, 1988 [JP] Japan .................................. 63-63809

[51] Int. Cl.$^5$ ............................................. C08G 77/06
[52] U.S. Cl. ...................... 528/12; 525/100; 525/105; 525/409; 528/17; 528/18; 528/21; 528/23; 528/33; 528/34; 528/901
[58] Field of Search ...................... 525/409, 100, 105; 528/33, 34, 18, 23, 21, 12, 17, 901

[56] References Cited

U.S. PATENT DOCUMENTS 4,593,068  6/1986  Hirose et al. .................... 525/100

FOREIGN PATENT DOCUMENTS 0300146  1/1989  European Pat. Off. .

*Primary Examiner*—Melvyn I. Marquis
*Attorney, Agent, or Firm*—Wegner, Cantor, Mueller & Player

[57] ABSTRACT

A curable polymer composition comprising
  (A) an alkyl (meth)acrylate base polymer having a silicon-containing reactive group,
  (B) an oxyalkylene base polymer having a silicon-containing reactive group,
  (C) a silicon-containing compound having three or four hydrolyzable groups bonded to the silicon atom,
  (D) a silicon-containing compound having two hydrolyzable groups bonded to the silicon atom and
  (E) a curing accelerator wherein the compounds (C), (D) and (E) are contained in amounts of 0.01 to 30 parts by weight, 0.1 to 30 parts by weight and 0.01 to 10 parts by weight per 100 parts by weight of the total amount of the polymers (A) and (B), which composition has improved storage stability while a cured material therefrom has good mechanical properties, particularly elongation.

9 Claims, No Drawings

CURABLE POLYMER COMPOSITION

BACKGROUND OF THE INVENTION

1. Field of the Invention

The present invention relates to a curable polymer composition. More particularly, the present invention relates to a curable polymer composition comprising a curable alkyl (meth)acrylate, a curable oxyalkylene base polymer and two specific silicon-containing compounds, which composition has improved storage properties without deteriorating elongation of a cured material produced from said composition.

The term "alkyl (meth)acrylate" herein used is intended to mean an alkyl ester of acrylic acid and/or an alkyl ester of methacrylic acid.

2. Description of the Related Art

Polymers of alkyl (meth)acrylates having at least one silicon-containing group to the silicon atom of which a hydroxy group or a hydrolyzable group is bonded and which is cross linkable through formation of a siloxane bond (hereinafter referred to as a "silicon-containing reactive group") are disclosed in Japanese Patent Kokai Publication No. 36395/1979 and the like. Such polymers are cured by crosslinking the silicon-containing reactive group particularly with moisture in the air to provide a cured material having good weather resistance and water resistance.

Polymers comprising oxyalkylene units having the silicon-containing reactive group are disclosed in U.S. Pat. Nos. 3,971,751, 3,979,384 and 4,323,488 the disclosures of which are hereby incorporated by reference, Japanese Patent Publication Nos. 36319/1970, 12154/1971 and 32673/1974, and Japanese Patent Kokai Publication Nos. 156599/1975, 73561/1976, 6096/1979, 82123/1980, 123620/1980, 125121/1980, 131022/1980, 135135/1980 and 137129/1980. The oxyalkylene base polymers are also cured by crosslinking them at room temperature to provide an elastomeric cured material having good elongation properties.

The alkyl (meth)acrylate base polymers having the silicon-containing reactive group provide a fragile cured material. Even though they are prepared to have a low glass transition temperature, the cured material has deteriorated tensile properties such as a small tensile elongation and greatly decreased strength.

The oxyalkylene base polymers having the silicon-containing reactive group give cured material having good tensile properties although the cured material has insufficient weather resistance or poor adhesion to various substrates.

As above, neither the alkyl (meth)acrylate base polymer having the silicon-containing reactive group nor the oxyalkylene base polymer having the silicon-containing reactive group can provide the cured material with satisfactory properties. These defects of the two polymers are due to the structures of the backbone chains.

To improve the defects of the alkyl (meth)acrylate base polymer having the silicon-containing reactive group or those of the oxyalkylene base polymer having the silicon-containing reactive group, a composition comprising these two polymers is proposed (cf. U.S. Pat. Nos. 4,593,068 and U.S. patent application Ser. No. 246,102, filed Sep. 19, 1988 and now abandoned).

To adjust elongation or strength at break of the cured material of the composition comprising the above two polymers, it is possible to add a silicon-containing compound having a hydrolyzable group bonded to the silicon atom (cf. U.S. patent application Ser. No. 187,140 filed Apr. 28, 1988, now U.S. Pat. No. 4,910,255). The silicon-containing compound also serves for improving storage stability of the composition and prevents gelation or viscosity increase of the composition. However, the silicon-containing compound which can sufficiently improve the storage stability of the composition decreases the elongation of the cured material of the composition. Accordingly, when the decrease of elongation of the cured material is undesirable, it is difficult to provide a composition having good storage stability.

SUMMARY OF THE INVENTION

An object of the present invention is to provide a curable polymer composition comprising an alkyl (meth)acrylate base polymer having a silicon-containing reactive group and an oxyalkylene base polymer having a silicon-containing reactive group, which composition has good storage stability and can provide a cured material having good elongation.

Accordingly, the present invention provides a curable polymer composition comprising (A) an alkyl (meth)acrylate base polymer having a silicon-containing reactive group, (B) an oxyalkylene base polymer having a silicon-containing reactive group, (C) a silicon-containing compound having three or four hydrolyzable groups bonded to the silicon atom, (D) a silicon-containing compound having two hydrolyzable groups bonded to the silicon atom and (E) a curing accelerator wherein the components (C), (D) and (E) are contained in amounts of 0.01 to 30 parts by weight, 0.1 to 30 parts by weight and 0.01 to 10 parts by weight per 100 parts by weight of the total amount of the polymers (A) and (B).

Based on the fact that the components (C) and (D) are simultaneously used, the cured material of the curable polymer composition of the present invention has another advantage, namely large adhesion to the substrate.

DETAILED DESCRIPTION OF THE INVENTION

As one of the components of the curable composition of the present invention, the alkyl (meth)acrylate base polymer having the silicon-containing reactive group (hereinafter referred to as "polymer (A)") is used.

The molecular chain of the polymer (A) comprises at least 50% by weight, preferably at least 70% by weight of repeating units derived from alkyl (meth)acrylate. The molecular chain may comprise a single kind of alkyl (meth)acrylate unit, or two or more kinds of alkyl (meth)acrylate units. In addition, the polymer (A) may comprise a single kind of the molecular chain, or two or more kinds of molecular chains.

The polymer (A) has preferably an average molecular weight of 500 to 100,000, more preferably 1,000 to 75,000 in view of handleability.

When the molecular chain of the polymer (A) comprises less than 50% by weight of the alkyl (meth)acrylate repeating units, the compatibility of the polymer (A) with the oxyalkylene base polymer having the silicon-containing reactive group tends to deteriorate.

As an alkyl residue in the alkyl (meth)acrylate, alkyl groups having 1 to 30 carbon atoms are preferred. The alkyl group may be a straight or branched one. Specific examples of the alkyl group are methyl, ethyl, propyl, n-butyl, isobutyl, 1-ethylpropyl, 1-methylpentyl, 2-methylpentyl, 3-methylpentyl, 1-ethylbutyl, 2-ethylbutyl, isooctyl, 3,5,5-trimethylhexyl, 2-ethylhexyl, decyl, lauryl, tridecyl, cetyl, stearyl, alkyl having 22 carbon atoms, behenyl and the like.

Among the molecular chains of the polymer (A), a molecular chain comprising the alkyl (meth)acrylate units of the formula:

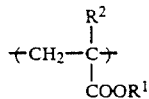

(I)

wherein $R^1$ is an alkyl group having 1 to 8 carbon atoms and $R^2$ is a hydrogen atom or a methyl group and the alkyl (meth)acrylate units of the formula:

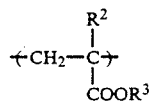

(II)

wherein $R^2$ is the same as defined above and $R^3$ is an alkyl group having at least 10 carbon atoms is preferred in view of better compatibility with the oxyalkylene base polymers having the silicon-containing reactive group.

The weight ratio of the repeating units (I) to the repeating units (II) is preferably from 95:5 to 40:60, more preferably from 90:10 to 60:40.

The alkyl group $R^1$ in the formula (I) has 1 to 8 carbon atoms, preferably 1 to 4 carbon atoms, more preferably 1 or 2 carbon atoms. Specific examples of the alkyl group $R^1$ are methyl, ethyl, propyl, n-butyl, tert.-butyl, 2-ethylhexyl and the like. All the alkyl groups $R^1$ in the polymer (A) are not necessarily the same one.

The alkyl group $R^3$ in the formula (II) has at least 10 carbon atoms, preferably 10 to 30 carbon atoms, more preferably 10 to 20 carbon atoms. Specific examples of the alkyl group $R^3$ are lauryl, tridecyl, cetyl, stearyl, alkyl having 22 carbon atoms, behenyl and the like. As in case of the alkyl group $R^1$, all the alkyl groups $R^3$ are not necessarily the same one, and may be a mixture, such as $C_{12}$ alkyl groups and $C_{13}$ alkyl groups.

The polymer (A) may comprise repeating units other than the alkyl (meth)acrylate repeating units. Examples of monomers providing such other repeating units are acrylic monomers (e.g. acrylic acid and methacrylic acid), polyfunctional (meth)acrylates (e.g. ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, etc.), monomers having an amide group (e.g. acrylamide, methacrylamide, N-methylolacrylamide, N-methylolmethacrylamide, etc.), monomers having an epoxy group (e.g. glycidyl acrylate, glycidyl methacrylate, etc.), monomers having an amino group (e.g. diethylaminoethyl acrylate, diethylaminoethyl methacrylate, aminoethyl vinyl ether, etc.), acrylonitrile, styrene, alpha-methylstyrene, alkyl vinyl ether, vinyl chloride, vinyl acetate, vinyl propionate, ethylene and the like.

The silicon-containing reactive group bonded to the backbone chain of the polymer (A) is the well known functional group and has such characteristic that it is cross linkable at room temperature. One of the typical silicon-containing reactive groups is represented by the formula:

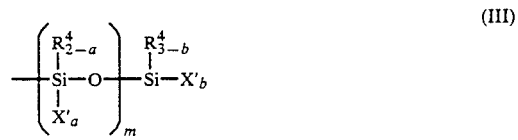

(III)

wherein $R^4$ is a substituted or unsubstituted $C_1$-$C_{20}$ organic group; $X'$ is a hydroxyl group or a hydrolyzable group; a is 0, 1 or 2; b is 0, 1, 2 or 3; and m is an integer of 0 to 19, provided that when two or more $R^4$ groups are present, they may be the same or different, that when two or more $X'$ substituents are present, they may be the same or different, that the sum of a and b is not less than 1 (one), that when m is not less than 2, the kinds of the repeating units in the brackets may be the same or different. Among the silicon-containing reactive groups (III), a group of the formula:

(IV)

wherein $R^4$ and $X'$ are the same defined above and l is 1, 2 or 3 is preferable from the economical view point.

In view of preferable curing properties of the composition, the polymer (A) may have at least one silicon-containing reactive group, preferably at least 1.1 silicon-containing reactive group, particularly 1.5 to 20 silicon-containing reactive groups on the average in a molecule.

Preferably, the polymer (A) has an apparent number average molecular weight of 300 to 20,000, preferably 500 to 8,000 par silicon-containing reactive group.

Specific examples of the hydrolyzable group $X'$ in the formula (III) are halogen atoms (e.g. chlorine), a hydrogen atom, alkoxy groups (e.g. a methoxy group and an ethoxy group), acyloxy groups (e.g. an acetoxy group), ketoxymate groups, (e.g. a dimethylketoxymate group), amino groups (e.g. a dimethylamino group), acid amide groups (e.g. an N-methylacetamide group), aminoxy groups (e.g. a dimethylaminoxy group), mercapto groups (e.g. a thiophenoxy group), alkenyloxy groups (e.g. an isopropenyloxy group), and the like. Among them, the alkoxy groups such as the methoxy group and the ethoxy group are preferred in view of their mild hydrolyzability.

The $R^4$ group in the formula (III) may be a substituted or unsubstituted $C_1$-$C_{20}$, preferably $C_1$-$C_{10}$ hydrocarbon group. Specific examples are substituted or unsubstituted alkyl groups (e.g. a methyl group, an ethyl group and a chloromethyl group), cycloalkyl groups (e.g. a cyclohexyl group), alkenyl groups (e.g. a vinyl group), substituted or unsubstituted aryl groups (e.g. a phenyl group, a tolyl group and a chlorophenyl group) and aralkyl groups (e.g. a benzyl group). Further example of the $R^4$ group is a triorganosiloxy group of the formula:

(R')$_3$SiO— wherein R' groups are the same or different and each a substituted or unsubstituted monovalent organic group such as a methyl group and a phenyl group. Among these groups, the methyl group is preferable as $R^4$.

The polymer (A) may be prepared by polymerizing the alkyl (meth)acrylate and optionally the unsaturated compound copolymerizable with the alkyl (meth)acrylate in the presence of a compound having both a polymerizable unsaturated bond and the silicon-containing reactive group by vinyl polymerization, for example, vinyl polymerization through a radial reaction. The polymerization may be carried out according to the conventional polymerization methods such as solution polymerization, bulk polymerization and the like. For example, the polymerization is carried out by polymerizing the above monomers at a temperature of 50° to 150° C., optionally in the presence of a radical polymerization initiator and further optionally in the presence of a chain transfer agent such as n-dodecylmercapran and tert.-dodecylmercaptan. A solvent may be present. When the solvent is used, inert solvents such as ethers, hydrocarbons and acetates are preferred.

As the compound having both the polymerizable unsaturated bond and the silicon-containing reactive group, exemplified is a compound of the formula:

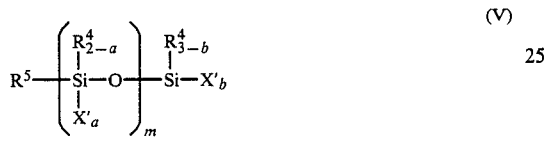

wherein $R^4$, $X'$, a, b and m are the same as defined above, and $R^5$ is an organic residue having a polymerizable unsaturated bond. Among the compounds (V), preferred is a compound of the formula:

wherein $R^2$, $X'$ and l are the same as defined above, and Q is a single bond or a divalent organic group of the formula:

in which $R^6$ is a divalent alkylene group having 1 to 6 carbon atoms such as —CH$_2$— and —CH$_2$CH$_2$—,

or

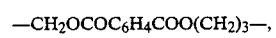

Specific examples of the compound (v) or (VI) are

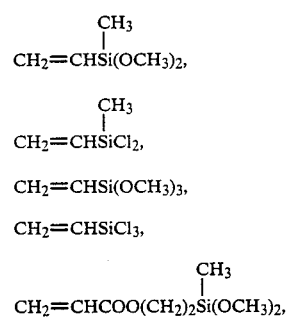

CH$_2$=CHCOO(CH$_2$)$_2$Si(OCH$_3$)$_3$,

CH$_2$=CHCOO(CH$_2$)$_2$SiCl$_2$ (with CH$_3$ on Si),

CH$_2$=CHCOO(CH$_2$)$_2$SiCl$_3$,

CH$_2$=C(CH$_3$)COO(CH$_2$)$_2$Si(OCH$_3$)$_2$ (with CH$_3$ on Si),

CH$_2$=C(CH$_3$)COO(CH$_2$)$_2$Si(OCH$_3$)$_3$ (with CH$_3$ on Si),

CH$_2$=C(CH$_3$)COO(CH$_2$)$_3$Si(OCH$_3$)$_2$ (with CH$_3$ on Si),

CH$_2$=C(CH$_3$)COO(CH$_2$)$_3$Si(OCH$_3$)$_3$,

CH$_2$=C(CH$_3$)COO(CH$_2$)$_3$SiCl$_2$ (with CH$_3$ on Si),

CH$_2$=C(CH$_3$)COO(CH$_2$)$_3$SiCl$_3$,

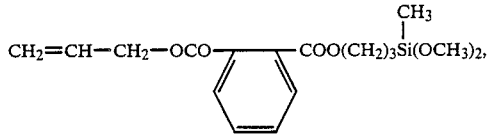

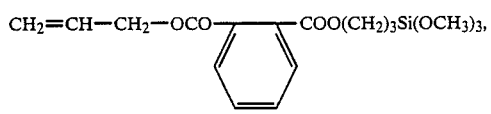

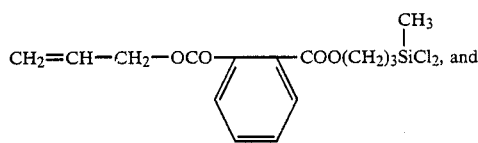

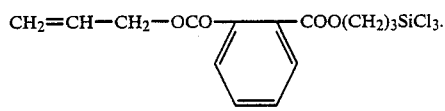

The above exemplified silane compounds may be prepared by various methods, for example, by reacting at least one of acetylene, allyl acrylate, allyl methacrylate and diallyl phthalate with at least one of methyldimethoxysilane and methyldichlorosilane in the presence of a catalyst comprising a transition metal of the group VIII of the Periodic Table. Examples of the transition metal catalyst are complex compounds of the VIII, group transition metals such as platinum, rhodium, cobalt, palladium and nickel. Among them, platinum base compounds such as platinum black, platinum-alcohol compounds, platinum olefin complexes, platinum aldehyde complexes, platinum ketone complexes and the like are preferred.

The polymer (A) may be prepared by introducing the silicon-containing reactive group in a polymer having no silicon-containing reactive group. For example, the monomer which provides the repeating units (I) and (II) is copolymerized with a compound having a polymerizable unsaturated bond and a reactive group containing no silicon (hereinafter referred to as "Y group") such as acrylic acid to produce a copolymer. Then, the copolymer is reacted with a compound having the silicon-containing reactive group and a functional group which reacts with the Y group (hereinafter referred to as "Y' group") such as a compound having an isocyanate group and the —Si(OCH$_3$)$_3$ group (e.g. OCN(CH$_2$)$_3$Si(OCH$_3$)$_3$).

There are various combinations of the Y group and the Y' group. One example of such combinations is a vinyl group as the Y group and a silicon hydride group (H—Si) as the Y' group. The Y group and the Y' group may react through the hydrosilyl reaction.

Examples of the compound having the vinyl group as the Y group and the polymerizable unsaturated bond are allyl acrylate, allyl methacrylate, diallyl phthalate, neopentyl glycol diacrylate, neopentyl glycol dimethacrylate, 1,5-pentanediol diacrylate, 1,5-pentanediol dimethacrylate, 1,6-hexanediol diacrylate, 1,6-hexanediol dimethacrylate, polyethylene glycol diacrylate, polyethylene glycol dimethacrylate, polypropylene glycol diacrylate, polypropylene glycol dimethacrylate, divinylbenzene, butadiene and the like.

A typical example of the compound having the silicon hydride group as the Y' group and the silicon-containing reactive group is a hydrosilane compound of the formula:

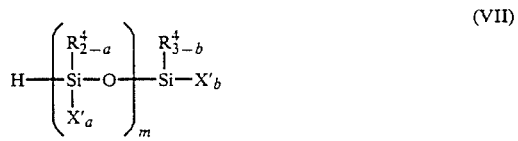

(VII)

wherein R$^4$, X', a, b and m are the same as defined above.

Specific examples of the compound (VII) are halogenated silanes (e.g. trichlorosilane, methyldichlorosilane, dimethylchlorosilane, trimethylsiloxydichlorosilane, etc.), alkoxysilanes (e.g. trimethoxysilane, triethoxysilane, methyldimethoxysilane, phenyldimethoxysilane, 1,3,3,5,5,7,7-heptamethyl- 1,1-dimethoxytetrasiloxane, etc.), acyloxysilanes (e.g. methyldiacetoxysilane, trimethylsiloxymethylacetoxysilane, etc.), ketoximatesilanes (e.g. bis(dimethylketoximate)methylsilane, bis(cyclohexylketoximate)methylsilane, bis(diethylketoximate)trimethylsiloxysilane, etc.), hydrosilanes (e.g. dimethylsilane, trimethylsiloxymethylsilane, 1,1-dimethyl-2,2-dimethyldisiloxane, etc.), alkenyloxysilanes (e.g. methyldi(isopropenyloxy)silane, etc.) and the like.

When the hydrosilane is reacted with the C=C bond, an arbitrary amount of the hydrosilane may be used. Preferably, 0.5 to 2 moles of the hydrosilane is used per mole of the C=C bond, although more hydrosilane may be used.

When the hydrosilane compound is reacted with the C=C bond, the catalyst comprising the VIII group metal complex may be used. The hydrosilyl reaction is carried out at a temperature of 50° to 130° C. for 1 to 10 hours.

Among the hydrosilane compounds, the halogenated silanes are preferably used because they are cheap and highly reactive.

When the halogenated silanes are used, the polymer (A) can be quickly cured by exposure to the air at room temperature with generating hydrogen halide. However, hydrogen halide has irritating odor and is corrosive, the halogenated silanes may be used in very limited applications. Therefore, the halogen atoms in the polymer (A) are preferably converted to other hydrolyzable group or the hydroxy group. Examples of such hydrolyzable group are an alkoxyl group, an acyloxy group, an aminoxy group, a phenoxy group, a thioalkoxy group and an amino group.

The halogen atom can be converted to the alkoxy group by replacing the halogen atom with
 (1) alcohols or phenols such as methanol, ethanol, 2-methoxyethanol, sec.-butanol, tert.-butanol or phenol,
 (2) alkali metal salts of the alcohols or phenols, or
 (3) alkyl orthoformate such as methyl orthoformate and ethyl orthoformate.

The halogen atom can be converted to the acyloxy group by replacing the halogen atom with
 (1) carboxylic acids such as acetic acid, propionic acid and benzoic acid, or
 (2) alkali metal salts of the carboxylic acids.

The halogen atom can be converted to the aminoxy group by replacing the halogen atom with
 (1) hydroxylamines such as N,N-dimethylhydroxylamine, N,N-diethylhydroxylamine, N,N-methylphenylhydroxylamine and N-hydroxypyrrolidine, or
 (2) alkali metal salts of the hydroxylamines.

The halogen atom can be converted to the amino group by replacing the halogen atom with
 (1) primary or secondary amines such as N,N-dimethylamine, N,N-methylphenylamine and pyrrolidine, or
 (2) alkali metal salts of the primary or secondary amines.

The halogen atom can be converted to the thioalkoxy group by replacing the halogen atom with
 (1) alkylmercaptans or arylmercaptans such as ethylmercaptan or thiophenol, or
 (2) alkali metal salts of the alkylmercaptans or arylmercaptans.

As in case of the halogen atom, the alkoxy group and the acyloxy group may be converted to other hydrolyzable groups such as the amino group and the aminoxy group or the hydroxy group.

The hydrolyzable group directly introduced in the silyl group through the hydrosilylation is converted to the other hydrolyzable group at a temperature of 50° to 150° C. The conversion reaction may be carried out in the presence or absence of a solvent. As the solvent to be used, inert solvents such as ethers, hydrocarbons and ethyl acetate are preferable.

Typical examples of the oxyalkylene base polymer having a silicon-containing reactive group (hereinafter referred to as "polymer (B)") are disclosed in U.S. Pat. Nos. 3,971,751, 3,979,384 and 4,323,488 the disclosures of which are hereby incorporated by reference, Japanese Patent Publication Nos. 36319/1970, 12154/1971 and 32673/1974, and Japanese Patent Kokai Publication Nos. 156599/1975, 73561/1976, 6096/1979, 82123/1980, 123620/1980, 125121/1980, 131022/1980, 135135/1980 and 137129/1980.

Preferably, the molecular chain of the polymer (B) essentially consists of the repeating units of the formula:

—R$^7$—O— wherein R$^7$ is a divalent alkylene group, preferably an alkylene group having 1 to 8 carbon atoms, more preferably an alkylene group having 3 or 4 carbon atoms. Specific examples of the group $R^7$ are —CH(CH$_3$)—CH$_2$—, —CH(C$_2$H$_5$)—CH$_2$—, —C(CH$_3$)$_2$—CH$_2$—, —CH$_2$CH$_2$CH$_2$CH$_2$— and the like. Among them, —CH(CH$_3$)—CH$_2$— is preferred. The molecular chain of the polymer (B) may contain a single kind of the repeating unit or two or more kinds of the repeating units.

The silicon-containing reactive group contained in the polymer (B) is the same as explained in connection with the polymer (A).

In view of preferably curing properties of the composition, the number of the silicon-containing reactive groups in the polymer (B) is at least one, preferably at least 1.1, particularly 1.5 to 4 on the average in a molecule. Preferably, the silicon-containing reactive group is bonded to the molecular chain end of the polymer (B).

The polymer (B) has a number average molecular weight of 500 to 30,000, preferably 3,000 to 15,000. The polymers (B) may be used independently or as a mixture of two or more of them.

The polymer (B) may be prepared by the addition reaction of the hydrosilane compound (VII) to the oxyalkylene base polymer having an unsaturated group of the formula:

(VIII)

wherein $R^8$ is a hydrogen atom or a monovalent organic group having 1 to 20 carbon atoms, $R^9$ is a divalent organic group having 1 to 20 carbon atoms, and c is 0 or 1 in the presence of the above described catalyst comprising the VIII group metal compound such as the platinum compounds.

Other methods for preparing the polymer (B) include
(1) a method comprising reacting a polyisocyanate compound such as toluenediisocyanate with an oxyalkylene base polymer having a terminal hydroxy group to obtain an oxyalkylene base polymer having a terminal isocyanate group, and then reacting the terminal isocyanate group with the W group of a silicon-containing compound of the formula:

(XI)

wherein $R^4$, $R^9$, X' and l are the same as defined above, and W is an active hydrogen-containing group selected from the group consisting of a hydroxy group, a carboxy group, a mercapto group and a primary or secondary amino group,
(2) a method comprising reacting the silicon-containing compound (IX) in which W is the mercapto group with the oxyalkylene base polymer having the unsaturated group (VIII), and
(3) a method comprising reacting the terminal hydroxy group of the oxyalkylene base polymer with a compound of the formula:

(X)

wherein $R^4$, $R^9$, X' and l are the same as defined above.

In the method comprising reacting the hydrosilyl compound (VII) and the oxyalkylene base polymer having the unsaturated group (VIII), at least a part of the X' groups in the reaction product may be converted to another hydrolyzable group or the hydroxy group. For example, when the X' group is the halogen atom or the hydrogen atom, it is preferably converted to the alkoxy group, the acyloxy group, the aminoxy group, the alkenyloxy group or the hydroxy group.

In the unsaturated group (VIII), $R^8$ is preferably the hydrogen atom or the hydrocarbon group, more preferably the hydrogen atom. $R^9$ is preferably a group of the formula: —$R^{10}$—, —$R^{10}$—O—$R^{10}$—, —$R^{10}$—OCO—, —$R^{10}$—NHCO— or —$R^{10}$—CO— wherein $R^{10}$ is a divalent hydrocarbon group having 1 to 10 carbon atoms.

The oxyalkylene base polymer having the unsaturated group (VIII) may be prepared by introducing the unsaturated group at the end of the molecular chain (cf. Japanese Patent Kokai Publication No. 6097/1979) or by copolymerizing an epoxy compound having the unsaturated group with an epoxy compound such as ethylene oxide or propylene oxide to introduce the unsaturated group in the side chain.

The silicon-containing compound having three or four hydrolyzable groups bonded to the silicon atom (hereinafter referred to as "silicon-containing compound (C)") is used to improve the storage stability of the curable polymer composition of the present invention, namely to prevent increase of viscosity or gelation. Some of the silicon-containing compounds (C) can improve the adhesion strength and/or mechanical strength of the cured material. The hydrolyzable group bonded to the silicon atom of the silicon-containing compound (C) may be the same as described above in connection with the silicon-containing reactive group. Preferably, the hydrolyzable group of the compound (C) is more reactive than that of the silicon-containing reactive group. When the number of the hydrolyzable groups bonded to the silicon atom of the silicon-containing compound (C) is less than 3, the storage stability is not sufficiently improved, since the hydrolyzable groups of the silicon-containing compound (C) preferentially react with water in the composition, whereby the storage stability of the composition is improved.

As the silicon-containing compound (C), preferable is a compound of the formula:

(XI)

wherein $R^{11}$ is a substituted or unsubstituted monovalent hydrocarbon group, and X is a hydrolyzable group provided that when two or more X are present, they may be the same or different, and n is 3 or 4.

In the formula (XI), $R^{11}$ is preferably a substituted or unsubstituted monovalent hydrocarbon group having 1 to 18 carbon atoms. Specific examples of $R^{11}$ are substituted or unsubstituted alkyl groups (e.g. methyl, ethyl, vinyl, methacryloxypropyl, etc.), substituted or unsubstituted aryl groups (e.g. phenyl, methylphenyl, etc.) and the like. As the hydrolyzable group X, an alkoxy group is preferred.

Specific examples of the silicon-containing compound (C) are trimethoxysilane, triethoxysilane, methyldimethoxysilane, methyltrimethoxysilane, ethyl silicate, methyltriethoxysilane, n-propyltrimethoxysilane, methyldiisopropenyloxysilane, methyltriisopropenoxysilane, phenyldimethoxysilane, phenyltrimethoxysilane, phenyltriethoxysilane, vinyltrimethoxysilane, vinyltriethoxysilane, γ-methacryloxypropyltrimethoxysilane, methyldiacetoxysilane, methyltriacetoxysilane, γ-aminopropyltrimethoxysilane, γ-aminopropyltriethoxysilane, γ-mercaptopropyltrimethoxysilane, γ-glycidoxypropyltrimethoxysilane, bis(dimethylketoximate)methylsilane, bis(cyclohexylketoximate)methylsilane, etc. Among them, alkyltrimethoxysilans and alkyltriethyxysilans are preferable since they are easily available and have better dehydration effects.

The silicon-containing compound having two hydrolyzable groups bonded to the silicon atom (hereinafter referred to as "silicon-containing compound (D)") is used to improve the mechanical elongation properties of the cured material and some of them also improve the mechanical strength.

The hydrolyzable group bonded to the silicon-containing compound (D) may be the same as described above in connection with the silicon-containing reactive group. When the number of the hydrolyzable groups bonded to the silicon atom of the silicon-containing compound (C) is less than 2, the curing rate of the composition is deteriorated. As the silicon-containing compound (D), a compound of the formula:

$$R^{11}{}_2SiX_2$$

wherein $R^{11}$ and X are the same as defined above, but the two $R^{11}$ groups may be the same or different, is preferred.

Specific examples of the silicon-containing compound (D) are dimethylsilane, dimethylchlorosilane, dimethyldimethoxysilane, dimethyldiethoxysilane, dimethyldiisopropenoxysilane, diphenyldimethoxysilane, diphenyldiethoxysilane, γ-methacryloxypropylmethyldimethoxysilane, N-(β-aminoethyl)aminopropylmethyldimethoxysilane, γ-mercaptopropylmethyldimethoxysilane, γ-glycidoxypropylmethyldiisopropenoxysilane, γ-glycidoxypropylmethyldimethoxysilane, etc. Among them, dimethyldimethoxysilane, diphenyldimethoxysilane, γ-methacryloxypropylmethyldimethoxysilane and N-(β-aminoethyl)aminopropylmethyldimethoxysilane are preferred, since they can improve both elongation and strength of the cured material.

As the curing accelerator (E), preferred are organic tin compounds, acid phosphates, reaction products of the acid phosphates with amines, saturated or unsaturated polybasic carboxylic acids or their anhydrides, organic titanate compounds, amines or their derivatives, lead octylate, etc.

Specific examples of the organic tin compounds are dibutyltin dilaurate, dibutyltin maleate, dioctyltin dimaleate, dibutyltin diacetate, dibutyltin phthalate, tin octylate, tin naphthenate,- dibutyltin methoxide, etc.

The acid phosphates are phosphates having a residue of the formula:

and include an organic acid phosphate of the formula:

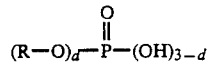

wherein R is an organic group and d is 1 or 2. Specific examples of the organic acid phosphate are $(CH_3O)_2POOH$, $CH_3OPO(OH)_2$, $(C_2H_5O)_2POOH$, $C_2H_5OPO(OH)_2$, $[(CH_3)_2CHO]_2POOH$, $(CH_3)_2CHOPO(OH)_2$, $(C_4H_9O)_2POOH$, $C_4H_9OPO(OH)_2$, $(C_8H_{17}O)_2POOH$, $C_8H_{17}OPO(OH)_2$, $(C_{10}H_{21}O)_2POOH$, $C_{10}H_{21}OPO(OH)_2$, $(C_{13}H_{27}O)_2POOH$, $C_{13}H_{27}OPO(OH)_2$, $(HO-C_8H_{16}O)_2POOH$, $HO-C_8H_{16}OPO(OH)_2$, $(HO-C_6H_{12}O)_2POOH$, $HO-C_6H_{12}OPO(OH)_2$, $[CH_2(OH)CH(OH)O]_2POOH$, $CH_2(OH)CH(OH)OPO(OH)_2$, $[CH_2(OH)CH(OH)C_2H_4O]_2POOH$, $CH_2(OH)CH(OH)-CH(OH)C_2H_4OPO(OH)_2$, etc.

The organic titanate compounds include tetrabutyl titanate, tetraisopropyl titanate, triethanolamine titanate, etc.

Specific examples of the amines or their derivatives are butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, quanidine, diphenylguanidine, 2,4,6-tris(dimethylaminomethyl)phenol, morpholine, N-methylmorpholine, 1,8-diazabicyclo[5.4.0]undecene-7 (DBU) and their salts with the carboxylic acids, low molecular weight polyamide resins prepared from excess polyamine and polybasic acids, reaction products of excess polyamine and epoxy compounds, etc.

The curable polymer composition of the present invention contains 5 to 5,000 parts by weight of the polymer (A) per 100 parts by weight of the polymer (B). At such weight ratio, the characteristics of the polymers are considerably improved. More preferably, 5 to 2,000 parts by weight of the polymer (A) is used per 100 parts by weight of the polymer (B). In the above range, the amounts of the polymers (A) and (B) are changed according to the final use and properties of the curable polymer composition.

The amount of the silicon-containing compound (C) is usually from 0.01 to 30 parts by weight, preferably from 0.1 to 10 parts by weight per 100 parts by weight of the total amount of the polymers (A) and (B) When the amount of the silicon-containing compound (C) is less than the above lower limit, the storage stability of the curable polymer composition is not sufficiently improved, while when said amount is larger than the above upper limit, the curing rate of the composition decreases.

The amount of the silicon-containing compound (D) is usually from 0.1 to 30 parts by weight, preferably from 1 to 20 parts by weight per 100 parts by weight of the total amount of the polymers (A) and (B). When the amount of the silicon-containing compound (D) is less than the above lower limit, the elongation properties of the cured material are not sufficiently improved, while when said amount is larger than the above upper limit, the curing rate of the composition decreases or the composition is undercured.

The amount of the curing accelerator (E) is usually from 0.01 to 10 parts by weight, preferably from 0.1 to 7 parts by weight per 100 parts by weight of the total amount of the polymers (A) and (B). When the amount of the curing accelerator (E) is less than the above lower limit, the cure of the curable polymer composition is not sufficiently accelerated, while when said amount is larger than the above upper limit, the curing accelerator may bleed onto the surface of the cured material.

If desired, the curable polymer composition of the present invention may contain conventionally used additives such as a plasticizer, a filler, an anti-sagging agent, a colorant, an anti-aging agent, an adhesion accelerator, a physical property modifier and the like.

Since the curable polymer composition of the present invention improves the storage stability while reserving the elongation properties of the cured material by the combination of the polymers (A) and (B) and further the addition of the silicon-containing compounds (C) and (D), the composition suffers from no or little increase of viscosity or gelation after prolonged storage and provides cured material having good mechanical strength, elongation and tear strength, particularly elongation.

Particularly when the polymer (A) has the molecular chain consisting essentially of the repeating units (I) and (II), the compatibility of the two polymers is improved so that they are easily solubilized. When the silicon-containing compounds (C) and (D) are added to the polymer system of the polymers (A) and (B), not only is the compatibility of the two polymers is further increased but also the viscosity stability and storage stability of the composition are improved. When the composition is three dimensionally crosslinked in such homogeneously compatibilized state, it provides cured material having excellent properties as follows:

(1) The cured material has improved properties much better than those expected from the properties of each polymer and the composition, for example, tensile properties such as elongation and tensile strength, adhesion strength, impact resistance, weather resistance, water resistance, solvent resistance, etc. Particularly, the tensile properties and the adhesion property are greatly improved.

(2) In comparison with the conventional curable composition comprising the alkyl acrylate base polymer having the silicon-containing reactive group and the oxyalkylene base polymer having the silicon-containing reactive group, the curable polymer composition of the present invention has better transparency, viscosity stability and storage stability. Particularly, turbidity and phase separation of the composition during storage are prevented. Since the compatibility between the polymers (A) and (B) is good, the blending ratio can be widely changed to vary the hardness of the composition. Thereby, the materials having wide variety of the properties can be designed.

When the curable polymer composition of the present invention contains the filler, it can be quickly cured to the deep portion.

The curable polymer composition of the present invention can be used as an adhesive, a coating, a waterproofing agent, a sealing agent, a templating agent, a castable rubber materials an expandable material and the like.

When the curable polymer composition of the present invention is used as adhesive, it can exert good adhesion strength, and can be applied as a structural adhesive having balanced adhesion strength between under peeling and under shear.

When the sealing agent comprising the curable polymer composition of the present invention is prepared in the absence of water or moisture and then stored in a sealed state, a one-pack type elastomeric sealing material can be prepared, which sealing material is stable after a prolonged storage and quickly cured when exposed to moisture in the air to provide a good rubbery elastomer. In addition, the cured material has good weather resistance, transparency and tensile elongation.

When the curable polymer composition of the present invention is used as the coating, the cured material has much larger tensile elongation and weather resistance than expected and good properties as a high covering power coating for constructions, primer for a concrete constructions and a waterproof material.

When the curable polymer composition of the present invention is used as waterproofing agent, since the cured material has good balance between the strength at break and elongation, improved durability and water resistance, blisters or peeling can be prevented.

PREFERRED EMBODIMENTS OF THE INVENTION

The present invention will be illustrated by following Examples, wherein "%" and "parts" are by weight unless otherwise indicated.

PREPARATION EXAMPLE 1

To xylene (257 parts) heated at 110° C., a mixture of butyl acrylate (7.4 parts), methyl methacrylate (447 parts), stearyl methacrylate (Acryester S manufactured by Mitsubishi Rayon) (117 parts), γ-methacryloxypropyltrimethoxysilane (TSMA) (29.1 parts) and γ-mercaptopropyltrimethoxysilane (12.0 parts) in which mixture azobisisobutyronitrile (AIBN) (30.0 parts) as a polymerization initiator was dissolved was dropwise added over 6 hours followed by post polymerization for 2 hours to obtain a slurry containing 70% of a resinous solid containing a copolymer. The copolymer had an average molecular weight (Mn) of 3,700 and the molecular weight distribution (Mw/Mn) of 1.8. The polymerization conversion was 100%.

PREPARATION EXAMPLE 2

In an autoclave equipped with a stirrer, polyoxypropylene base polymer, 97% of the molecular ends of which had allyl ether groups (average molecular weight, about 8,000), (800 g) was charged followed by the addition of methyldimethoxysilane (19 g). To this mixture, 0.34 ml of a solution of chloroplatinic acid (H$_2$PtCl$_6$.6H$_2$O) (8.9 g) in a mixture of isopropanol (18 ml) and tetrahydrofuran (160 ml) was added, and the reaction was conducted at 80° C. for 6 hours to obtain polyoxypropylene base polymer having a molecular weight of about 8,200 and 1.7 groups of the formula:

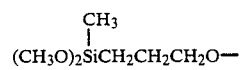

per molecule on the average according to the quantitative analysis of the silicon-containing groups through the NMR analysis. The reaction mixture contained little silicon hydride groups according to the analysis of the amount of residual silicon hydride residues therein by IR spectroscopy.

EXAMPLES 1-4 AND COMPARATIVE EXAMPLES 1-3

The polymer (A) prepared in Preparation Example 1 and the polymer (B) prepared in Preparation Example 2 were mixed in the same solid amounts. Then, to the polymer mixture, the components (C) and (D) were added in the amounts specified in Table 1 and then 2 parts of the dibutyltin type curing catalyst (#918 manufactured by Sankyo Organic Synthesis) was added followed by thorough mixing to obtain a curable polymer composition.

The storage stability of the composition and mechanical properties of the cured material were measured.

Storage stability

The viscosity of the curable polymer composition was measured before storage and after storage in a sealed glass bottle at 50° C. for 60 days.

Mechanical properties

The curable polymer composition is casted to form a sheet having a thickness of 2 to 3 mm and cured at room temperature for 7 days. The cured sheet is cut out in the form of a JIS B No. 3 dumbbell and subjected to the tensile test at a pulling rate of 200 mm/min. at 23° C.

The results are shown in Table 1.

to prepare a one-pot type adhesive, which was subjected to the following adhesion test.

Preparation of a sample for T-form peel strength measurement and testing method (JIS K 6854)

On a surface of a canvas sheet (No. 9 canvas according to JIS K 6851) of 200 mm×25 mm×0.7 mm, the adhesive composition was coated in an area of about 25 mm×100 mm to a thickness of about 0.3 mm with a spatula. Then, a pair of the canvas sheets were laminated with the surfaces having the adhesive layer facing each other and pressed by rolling a hand roller of 5 kg in one direction along the length five times. Then the sample was cured at 23° C. for 2 days and aged at 50° C. for 3 days. The cured sample was set on the T-form peel testing machine and peeled at a pulling rate of 200 mm/min. The T-form peel strength is expressed in terms of strength at the adhesive failure.

Preparation of a sample for 180 degree peel strength measurement and testing method (JIS K 6851)

A surface of an aluminum plate (A-1050P aluminum plate defined by JIS H 4000) of 100 mm×25 mm×2 mm is gently wiped with acetone. On said surface, the adhesive composition is coated in an area of about 25 mm×70 mm to a thickness of 0.3 mm with a spatula.

The canvas sheet having the coated adhesive compo-

TABLE 1

| Example No. | Component (C) (parts)[1] | Component (D) (parts)[1] | Storage stability Before storage | Storage stability After storage | Mechanical properties Elongation at break (%) | Mechanical properties Strength at break (kg/cm$^2$) |
|---|---|---|---|---|---|---|
| 1 | PTS-31[2] (3.0) | KBM202[3] (5.0) | 1,400 | 1,420 | 650 | 72 |
| 2 | A-1120[4] (3.0) | KBM202 (5.0) | 1,600 | 1,650 | 480 | 65 |
| 3 | A-174[5] (3.0) | KBM602[6] (3.0) | 1,680 | 1,750 | 630 | 52 |
| 4 | MTS-31[7] (3.0) | KBM602 (3.0) | 1,650 | 1,820 | 580 | 61 |
| Com. 1 | — | — | 2,700 | Gelled | 520 | 51 |
| Com. 2 | PTS-31 | — | 1,900 | 2,050 | 290 | 48 |
| Com. 3 | — | KBM602 (3.0) | 2,100 | 5,300 | 510 | 32 |

Note
[1] Parts per 100 parts of the total amount of the polymers (A) and (B).
[2] Phenyltrimethoxysilane manufactured by Daihachi Chemical Industries.
[3] Diphenyldimethoxysilane manufactured by Shinetsu Silicone.
[4] N-(2-aminoethyl)-γ-aminopropyltrimethoxysilane manufactured by Nippon Unicar.
[5] γ-Methacryloxypropyltrimethyxysilane manufacture by Nippon Unicar.
[6] N-(2-aminoethyl)-γ-aminopropylmethyldimethoxysilane manufactured by Shinetsu Silicone.
[7] Methyltrimethoxysilane manufactured by Daihachi Chemical Industries.

As understood from the results of Table 1, the presence of the components (C) and (D) improves the storage stability of the curable polymer composition while not decreasing the elongation property of the cured product of the composition.

EXAMPLES 5-6 AND COMPARATIVE EXAMPLES 4-5

The polymer (A) prepared in Preparation Example 1 and the polymer (B) prepared in Preparation Example 2 were mixed in the weight ratio of 40:60 as the solid materials. From the mixture, the solvent was evaporated off under reduced pressure at 100° C. with a rotary evaporator to obtain a viscous transparent pale yellow resin mixture containing no solvent.

To the resin mixture (100 parts), #910 (2.0 parts) as the component (E), A-1120 (2.0 parts) or MTS-31 (3.0 parts) as the component (C) and KBM202 (5.0 parts) or KBM602 (2.0 parts) as the component (D) were added sition as used in the T-form peel test as described above is laminated on the aluminum plate with the surfaces having the adhesive layer facing each other and pressed with the hand roller in the same manner as above.

The laminated sample is cured with fixing the adhered areas at 23° C. for 2 days and aged at 50° C. for 3 days. The cured sample is subjected to the tensile test at a pulling rate of 200 mm/min.. The 180 degree peel strength is expressed in terms of strength at the adhesive failure.

The results are shown in Table 2.

TABLE 2

| Example No. | Component (C) (parts) | Component (D) (parts) | T-form peel strength (kgf/25 mm) | 180 Degree peel strength (kgf/25 mm) |
|---|---|---|---|---|
| 5 | A-1120 (2.0) | KBM202 (5.0) | 7.8 | 8.2 |
| 6 | MTS-31 | KBM602 | 7.5 | 8.0 |

TABLE 2-continued

| Example No. | Component (C) (parts) | Component (D) (parts) | T-form peel strength (kgf/25 mm) | 180 Degree peel strength (kgf/25 mm) |
|---|---|---|---|---|
| Com. 4 | A-1120 (2.0) | (3.0) (2.0) | 5.1 | 5.7 |
| Com. 5 | MTS-31 (3.0) | — | 4.8 | 5.2 |

As understood from the results of Tables 1 and 2, the presence of the components (C) and (D) improves the storage stability of the curable polymer composition and the adhesive strength of the cured material.

What is claimed is:

1. A curable polymer composition comprising:
   (A) an alkyl (meth)acrylate base polymer having at least one silicon atom bonded to a hydroxy group or a hydrolyzable group and which is cross linkable through formation of a siloxane bond,
   (B) an oxyalkylene base polymer having at least one silicon atom bonded to a hydroxy group or a hydrolyzable group and which is cross linkable through formation of a siloxane bond,
   (C) a silicon-containing compound having three or four hydrolyzable groups bonded to the silicon atom,
   (D) a silicon-containing compound having two hydrolyzable groups bonded to the silicon atom, and
   (E) a curing accelerator
   wherein the components (C), (D) and (E) are contained in amounts of 0.01 to 30 parts by weight, 0.1 to 30 parts by weight and 0.01 to 10 parts by weight, respectively, per 100 parts by weight of the total amount of the polymers (A) and (B).

2. The curable polymer composition according to claim 1, wherein the alkyl (meth)acrylate base polymer (A) comprises a molecular chain essentially consisting of (1) repeating units derived from alkyl (meth)acrylate having 1 to 8 carbon atoms in the alkyl group and (2) repeating units derived from alkyl (meth)acrylate having at least 10 carbon atoms in the alkyl group.

3. The curable polymer composition according to claim 1, wherein the alkyl (meth)acrylate base polymer (A) has a number average molecular weight of 500 to 100,000.

4. The curable polymer composition according to claim 1, wherein the alkyl (meth)acrylate base polymer (A) has, on the average, 1.5 to 20 of said silicon atoms.

5. The curable polymer composition according to claim 1, wherein the oxyalkylene base polymer (B) comprises a molecular chain essentially consisting of repeating units of the formula:

$$-R^7-O-$$

wherein $R^7$ is an alkylene group having 1 to 8 carbon atoms.

6. The curable polymer composition according to claim 1, wherein the oxyalkylene base polymer has an average molecular weight of 500 to 30,000.

7. The curable polymer composition according to claim 1, wherein the oxyalkylene base polymer has, on the average, 1.5 to 4 of said silicon atoms.

8. The curable polymer composition according to claim 1, wherein the silicon-containing compound (C) is a compound of the formula $$R^{11}{}_{4-n}SiX_n$$

wherein $R^{11}$ is a substituted or unsubstituted hydrocarbon group having 1 to 20 carbon atoms, X is a hydrolyzable group and n is 3 or 4.

9. The curable polymer composition according to claim 1, wherein the silicon-containing compound (D) is a compound of the formula:

$$R^{11}{}_2SiX_2$$

wherein $R^{11}$ is a substituted or unsubstituted hydrocarbon group having 1 to 20 carbon atoms and X is a hydrolyzable group.

* * * * *